(12) United States Patent
Kobayashi

(10) Patent No.: US 12,540,304 B2
(45) Date of Patent: Feb. 3, 2026

(54) CULTURING APPARATUS SETUP METHOD, ASSISTANCE APPARATUS, AND CULTURING APPARATUS

(71) Applicant: Hitachi High-Tech Corporation, Tokyo (JP)

(72) Inventor: Toyoshige Kobayashi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 929 days.

(21) Appl. No.: 17/762,392

(22) PCT Filed: Apr. 24, 2020

(86) PCT No.: PCT/JP2020/017702
§ 371 (c)(1),
(2) Date: Mar. 22, 2022

(87) PCT Pub. No.: WO2021/065062
PCT Pub. Date: Apr. 8, 2021

(65) Prior Publication Data
US 2022/0340862 A1 Oct. 27, 2022

(30) Foreign Application Priority Data
Oct. 4, 2019 (JP) ................................. 2019-183587

(51) Int. Cl.
*C12M 1/36* (2006.01)
*C12M 3/06* (2006.01)
(Continued)

(52) U.S. Cl.
CPC ............ *C12M 41/48* (2013.01); *C12M 27/16* (2013.01); *G01N 33/5005* (2013.01); *G01N 35/00693* (2013.01)

(58) Field of Classification Search
CPC ......... G01N 33/5005; G01N 35/00594; G01N 35/00598; G01N 35/00693; C12M 41/48; C12M 99/00
See application file for complete search history.

(56) References Cited

U.S. PATENT DOCUMENTS

2014/0116892 A1  5/2014  Rant et al.
2020/0402621 A1  12/2020  Miyauchi et al.

FOREIGN PATENT DOCUMENTS

JP    2013-537806 A    10/2013
JP    2019-41656 A     3/2019
(Continued)

OTHER PUBLICATIONS

Soares et al. "Investigating the feasibility of scale up and automation of human induced pluripotent stem cells cultured in aggregates in feeder free conditions"—Journal of Biotechnology, Jan. 17, 2014 (Year: 2014).*
(Continued)

*Primary Examiner* — Benjamin R Schmitt
(74) *Attorney, Agent, or Firm* — MATTINGLY & MALUR, PC

(57) ABSTRACT

According to the present invention, an initial-stage test apparatus-culturing condition (parameter set) is determined (22) on the basis of a manual culturing condition (26) for a specific cell. Multiple apparatus-culturing tests (20) are run in accordance with multiple test apparatus-culturing conditions, including the initial-stage test apparatus-culturing condition. A test apparatus-culturing condition at the time point when the result of an apparatus-culturing test satisfies requirement specifications is set (40) in a culturing apparatus as a setting apparatus-culturing condition, and the culturing apparatus is set up by using said setting apparatus-culturing condition.

8 Claims, 14 Drawing Sheets

(51) Int. Cl.
  *G01N 33/50*   (2006.01)
  *G01N 35/00*   (2006.01)

(56) References Cited

FOREIGN PATENT DOCUMENTS

| JP | 2019041656 A | * | 3/2019 | ............. C12M 3/00 |
|----|--------------|---|--------|-------------------------|
| WO | 2019/044559 A1 |  | 3/2019 | |
| WO | 2019/163304 A1 |  | 8/2019 | |

OTHER PUBLICATIONS

International Search Report of PCT/JP2020/017702 dated Jul. 28, 2020.

* cited by examiner

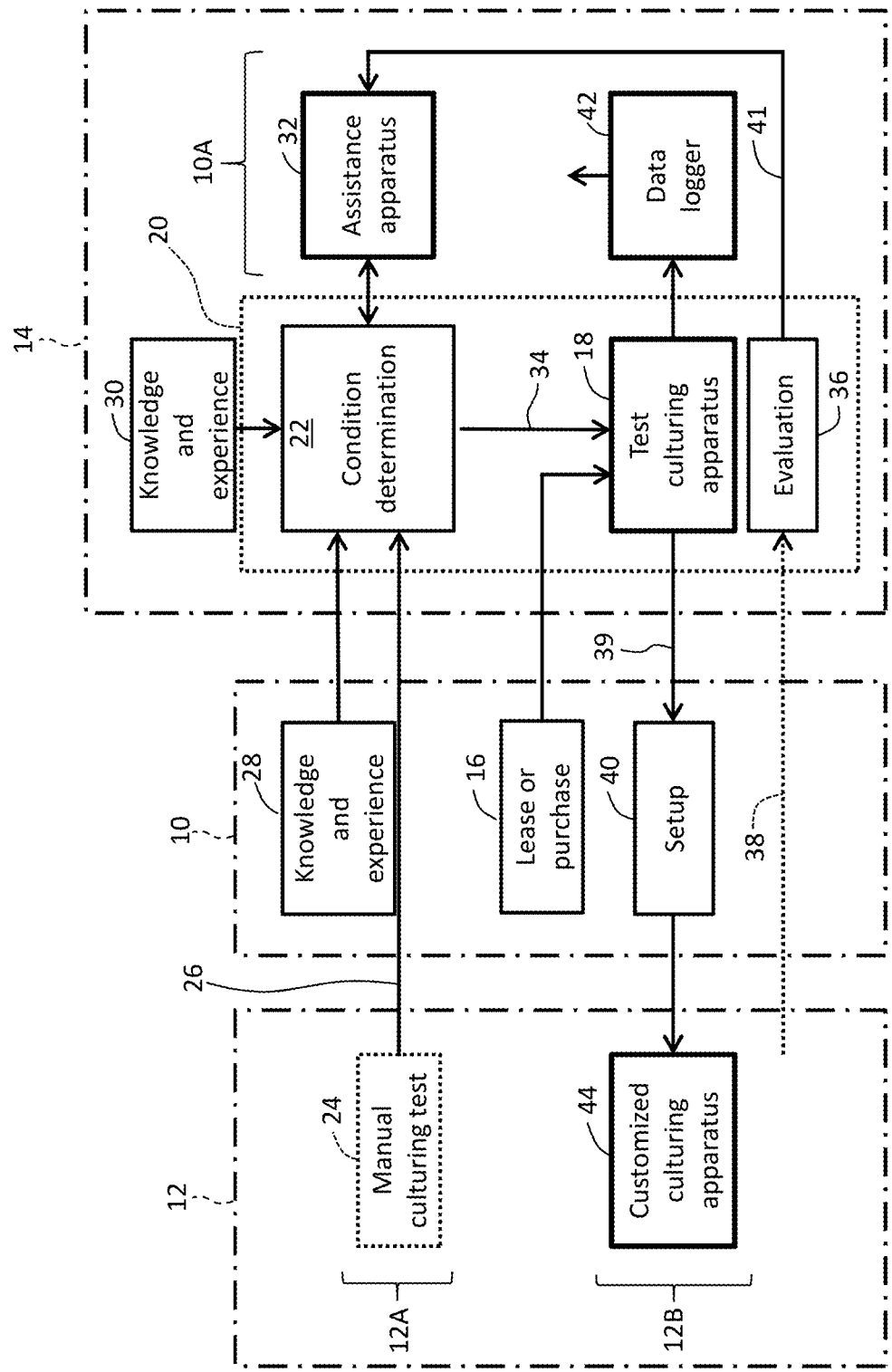
[Fig. 1]

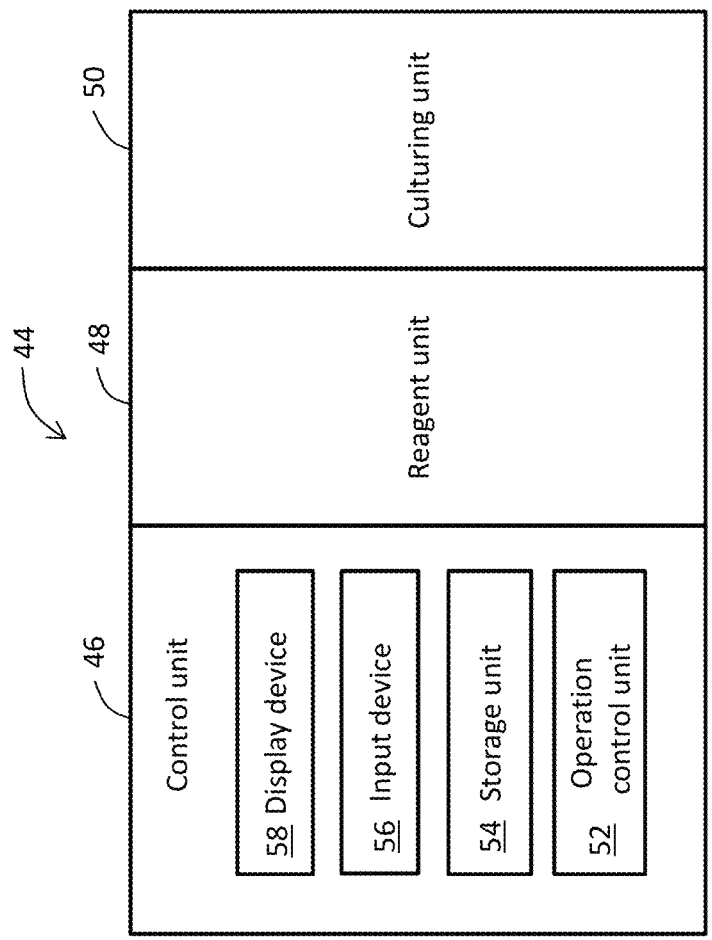

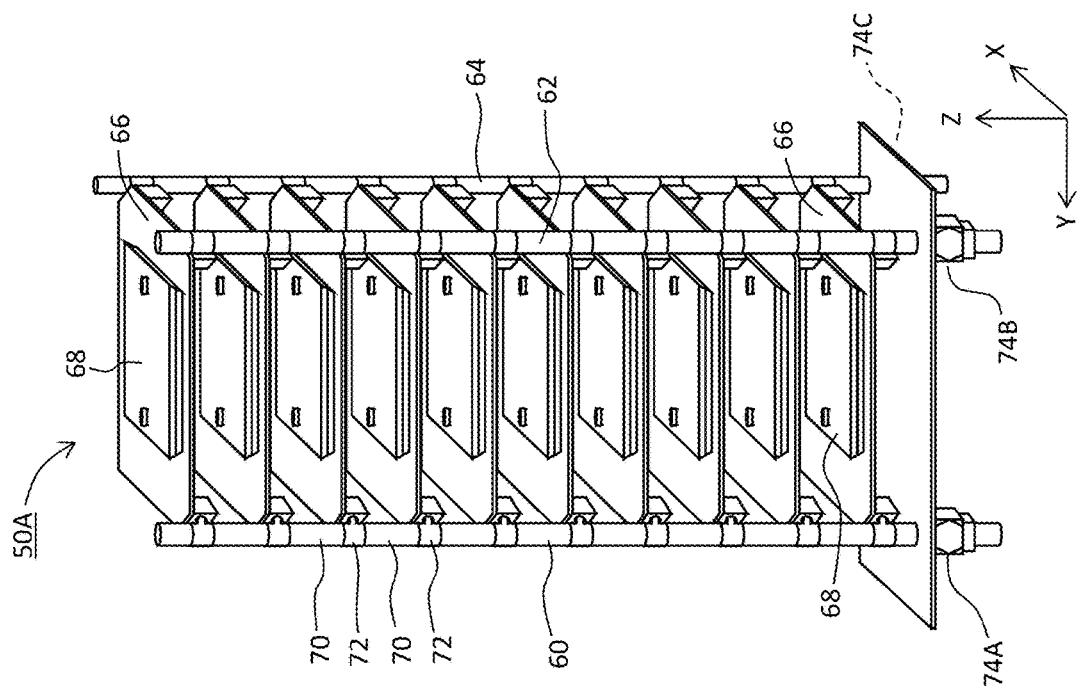
[Fig. 3]

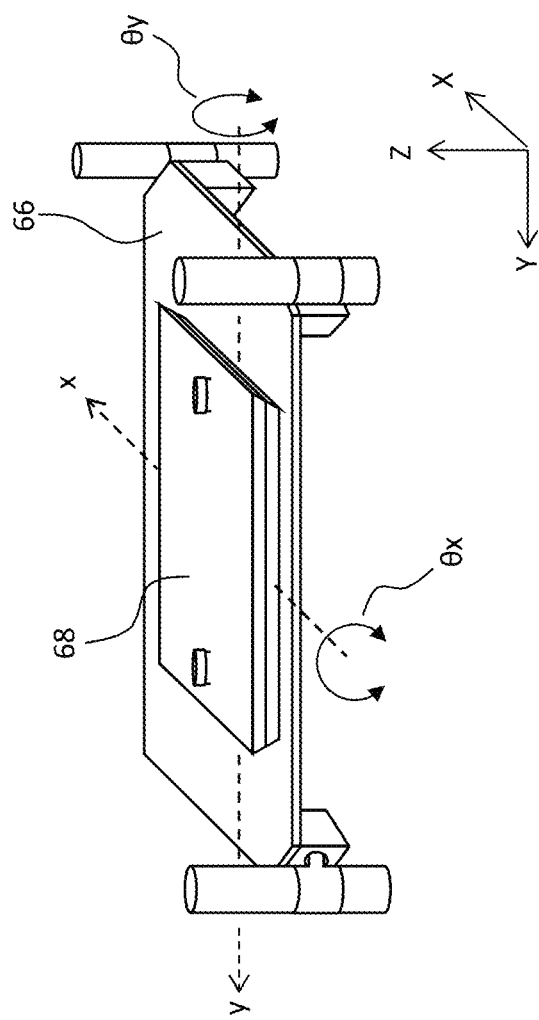
[Fig. 4]

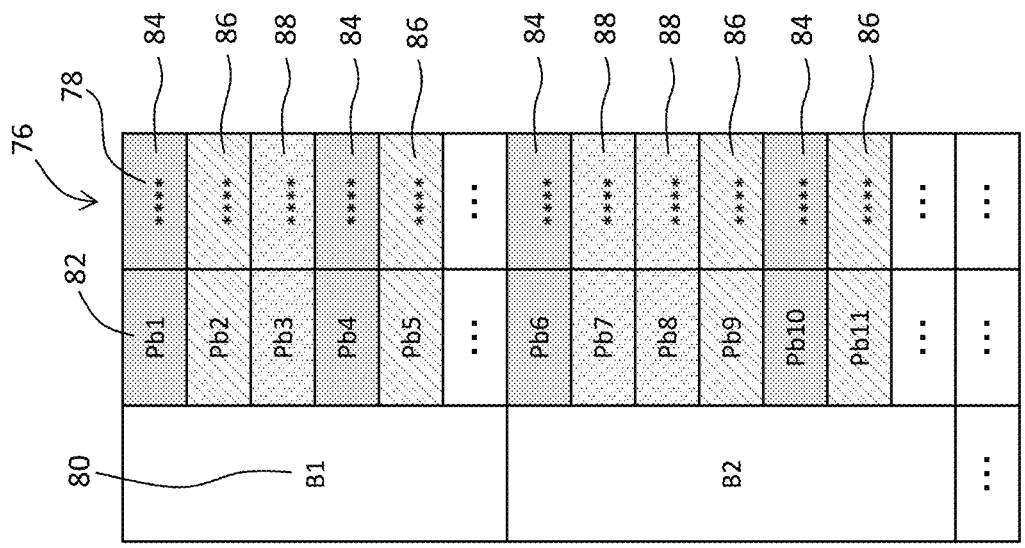
[Fig. 5]

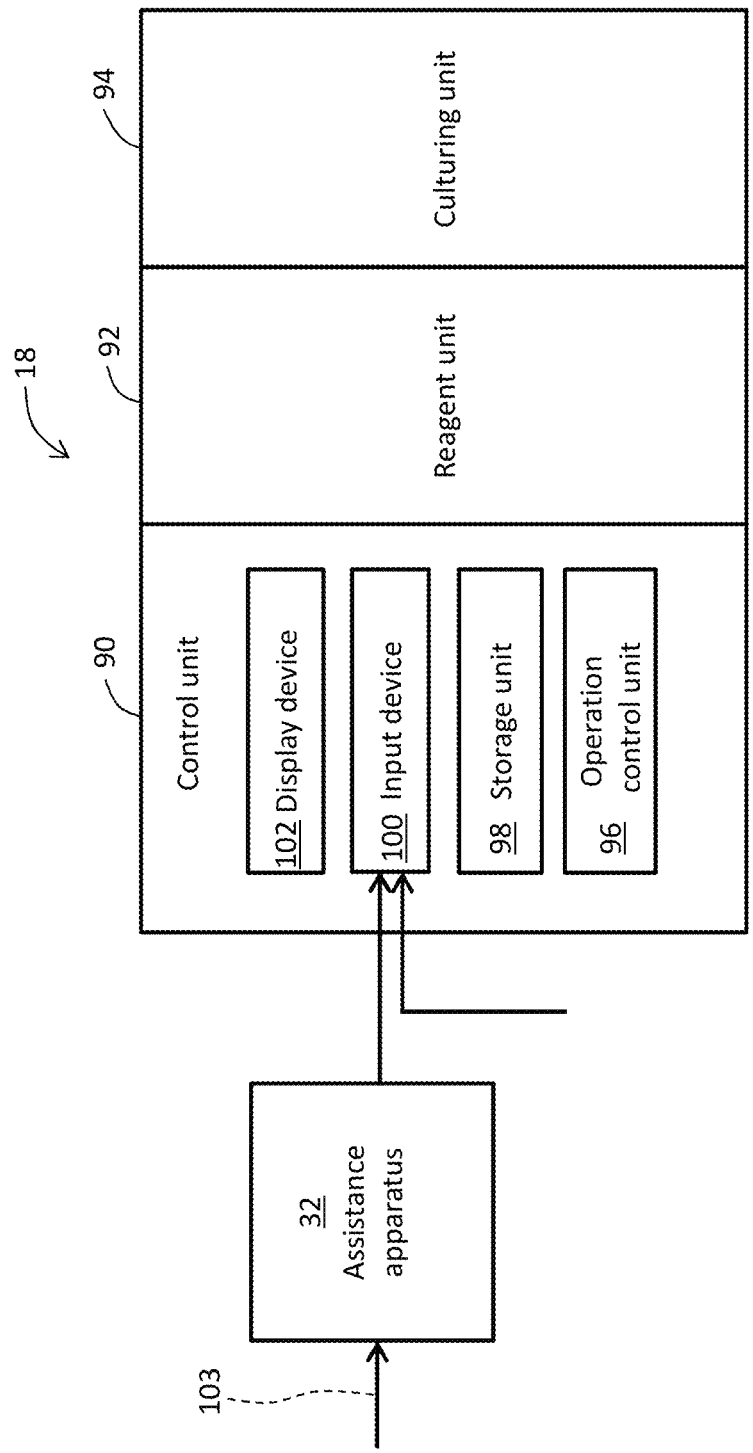

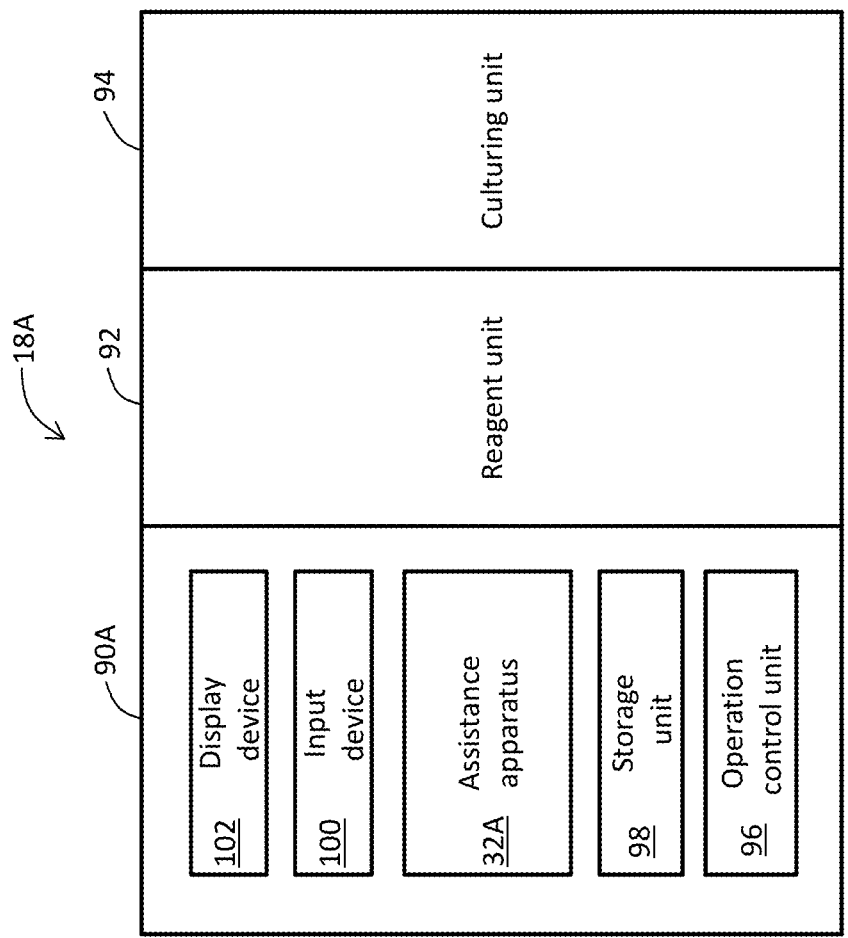

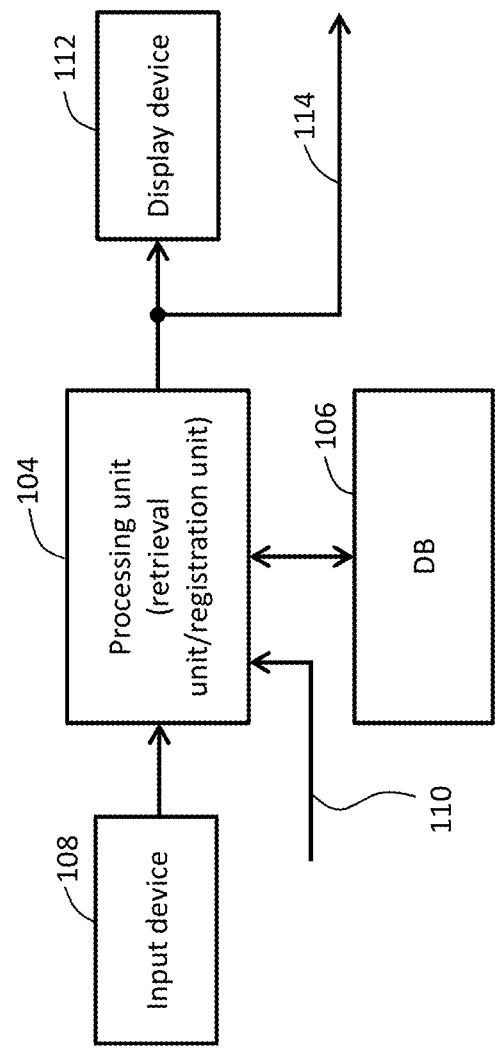
[Fig. 8]

[Fig. 9]

| Cell | Manual culturing condition | | | | | | | | | | Apparatus-culturing condition | | | | | | | | | | | |
|---|---|---|---|---|---|---|---|---|---|---|---|---|---|---|---|---|---|---|---|---|---|---|
| | | | | | | | | | | | | 84A | 86A | 88A | | | | | | | | |
| A1 | Pa1 | Pa2 | Pa3 | Pa4 | ... | Pa5 | Pa6 | Pa7 | ... | Pa8 | Pa9 | Pa10 | ... | B1 | Pb1 | Pb2 | Pb3 | Pb4 | Pb5 | ... | Pb6 | Pb7 | Pb8 | Pb9 | Pb10 | Pb11 | ... |
| A2 | **** | **** | **** | **** | ... | **** | **** | **** | ... | **** | **** | **** | ... | B2 | **** | **** | **** | **** | **** | ... | **** | **** | **** | **** | **** | **** | ... |
| A3 | ... | ... | ... | ... | ... | ... | ... | ... | ... | ... | ... | ... | ... | ... | ... | ... | ... | ... | ... | ... | ... | ... | ... | ... | ... | ... | ... |

Reference numerals: 106, 118, 120, 122, 124, 126, 116-1, 116-2, 116-n

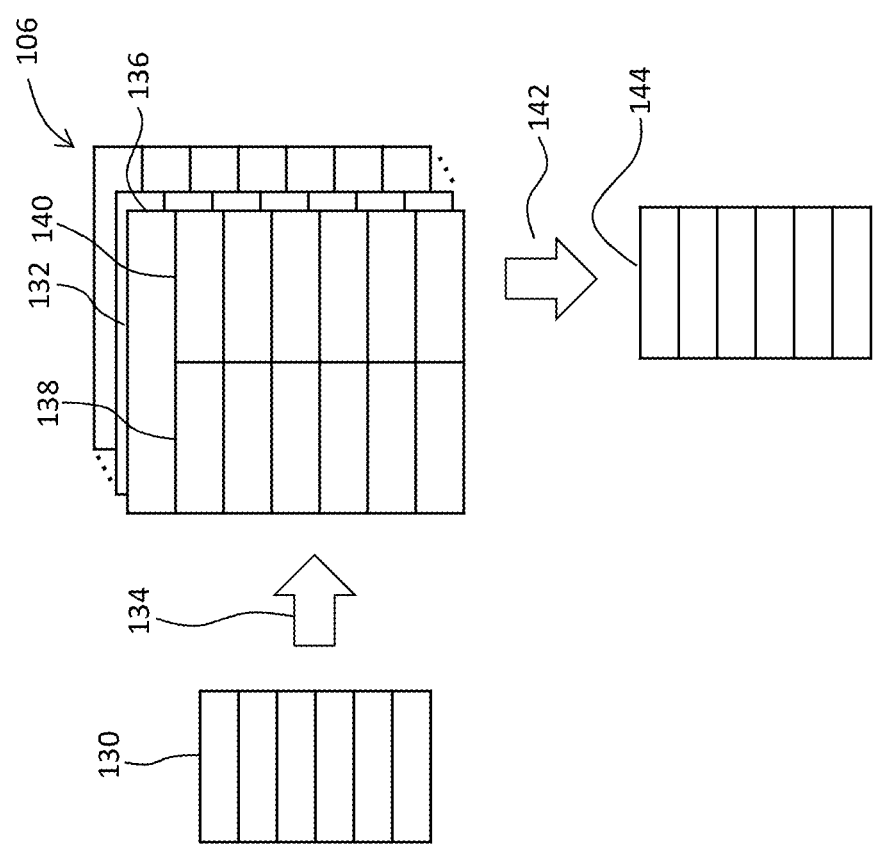

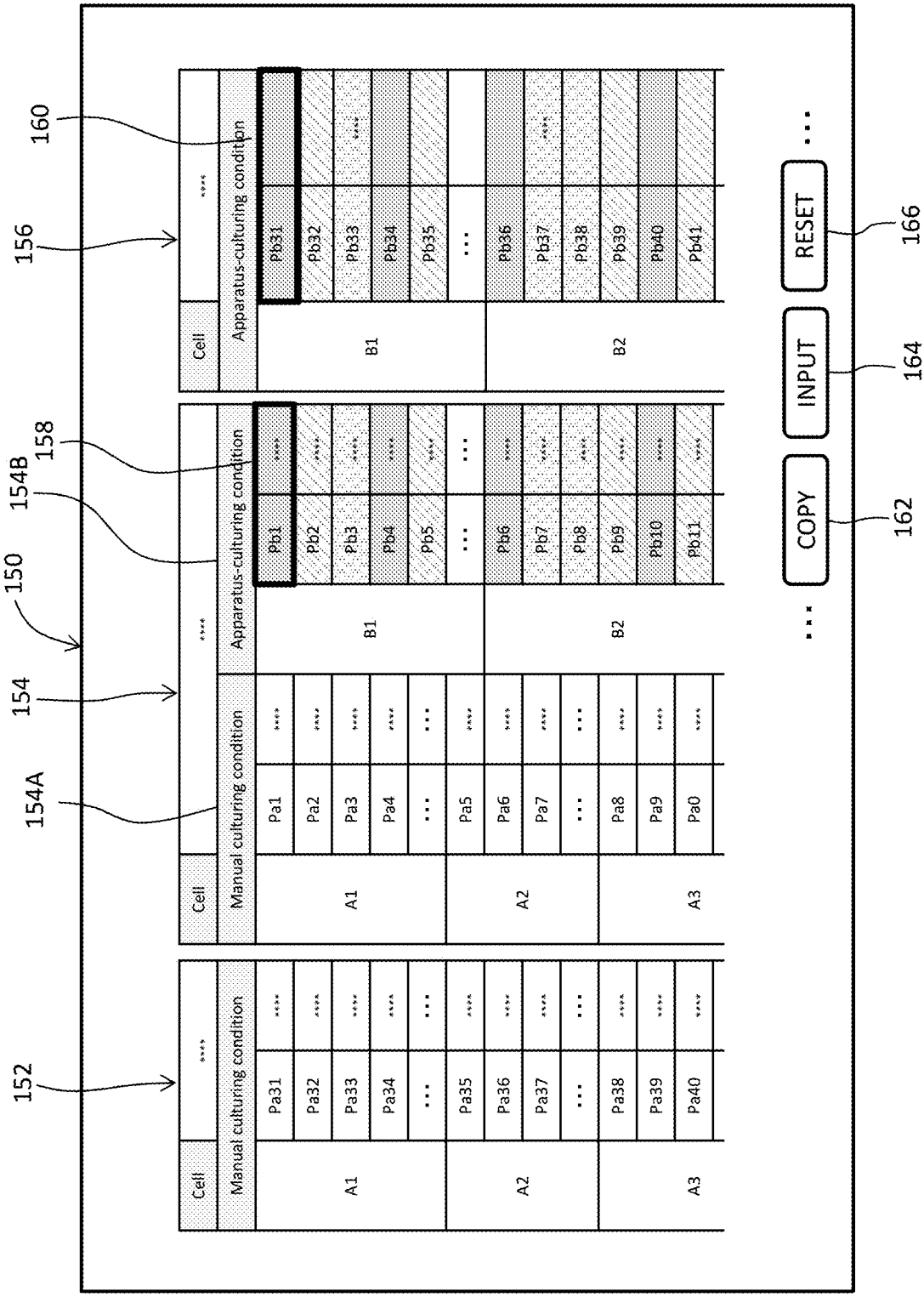
[Fig. 11]

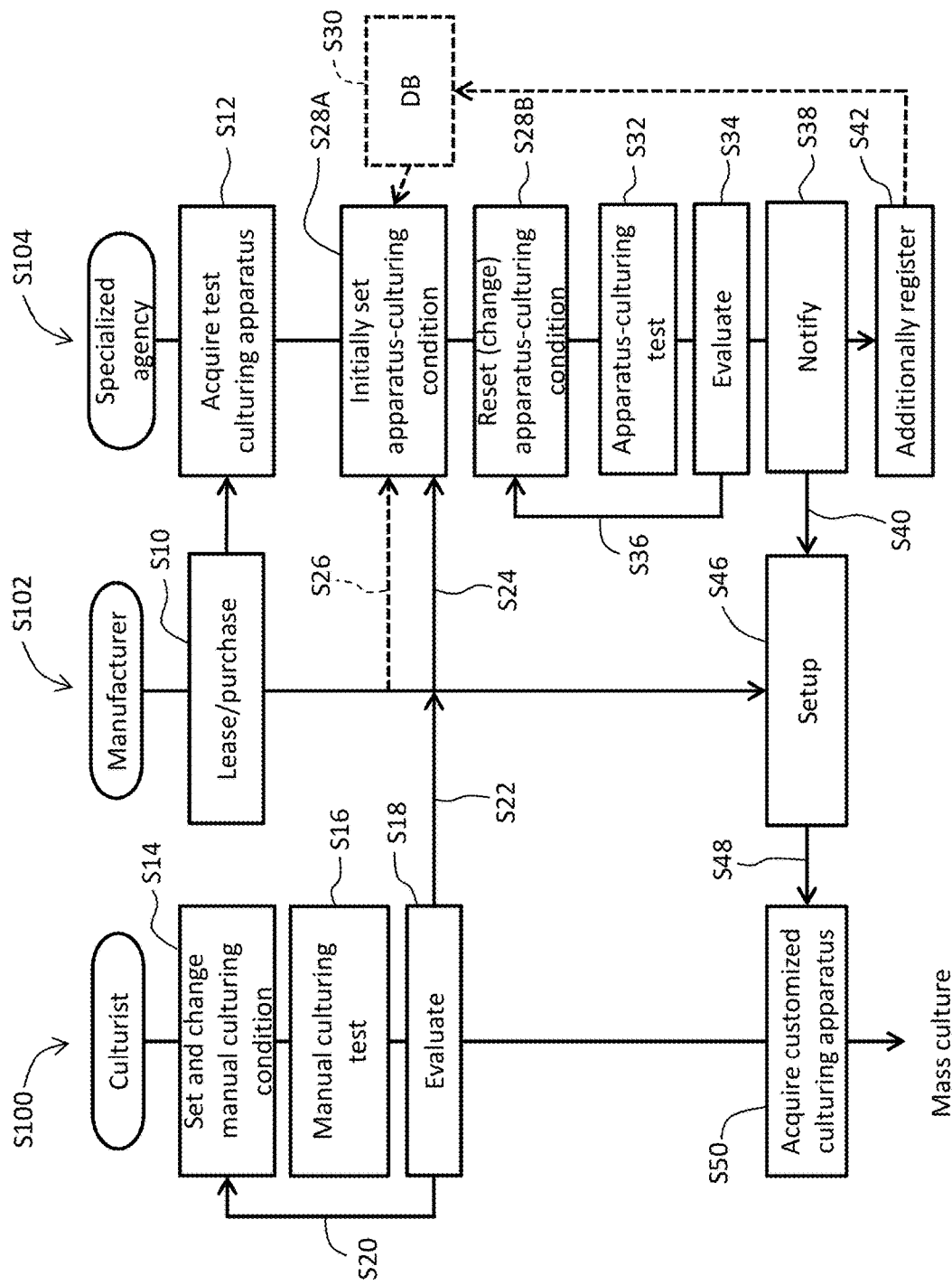

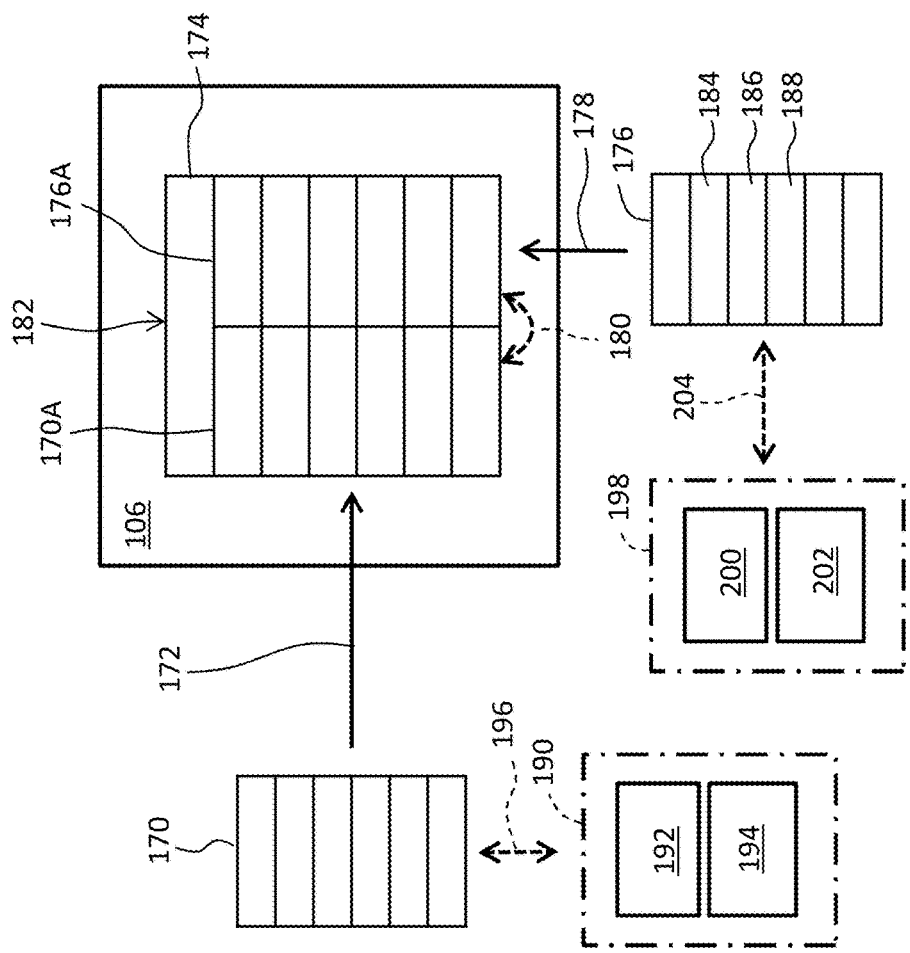
[Fig. 14]
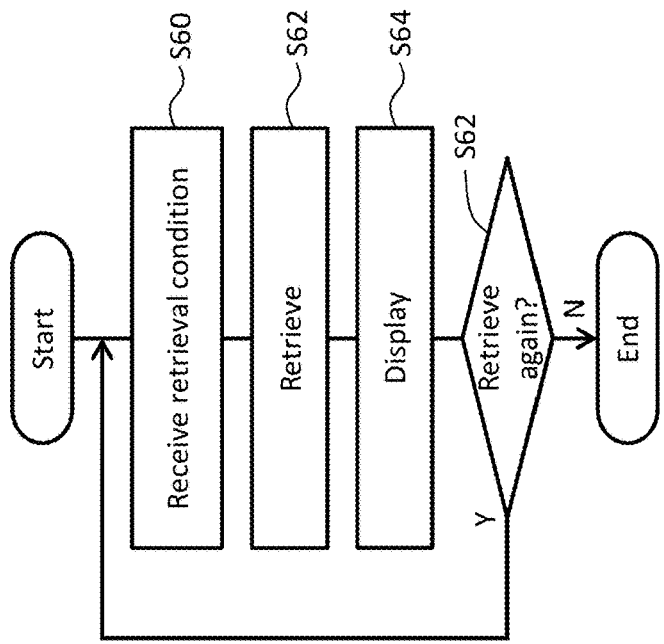
[Fig. 13]

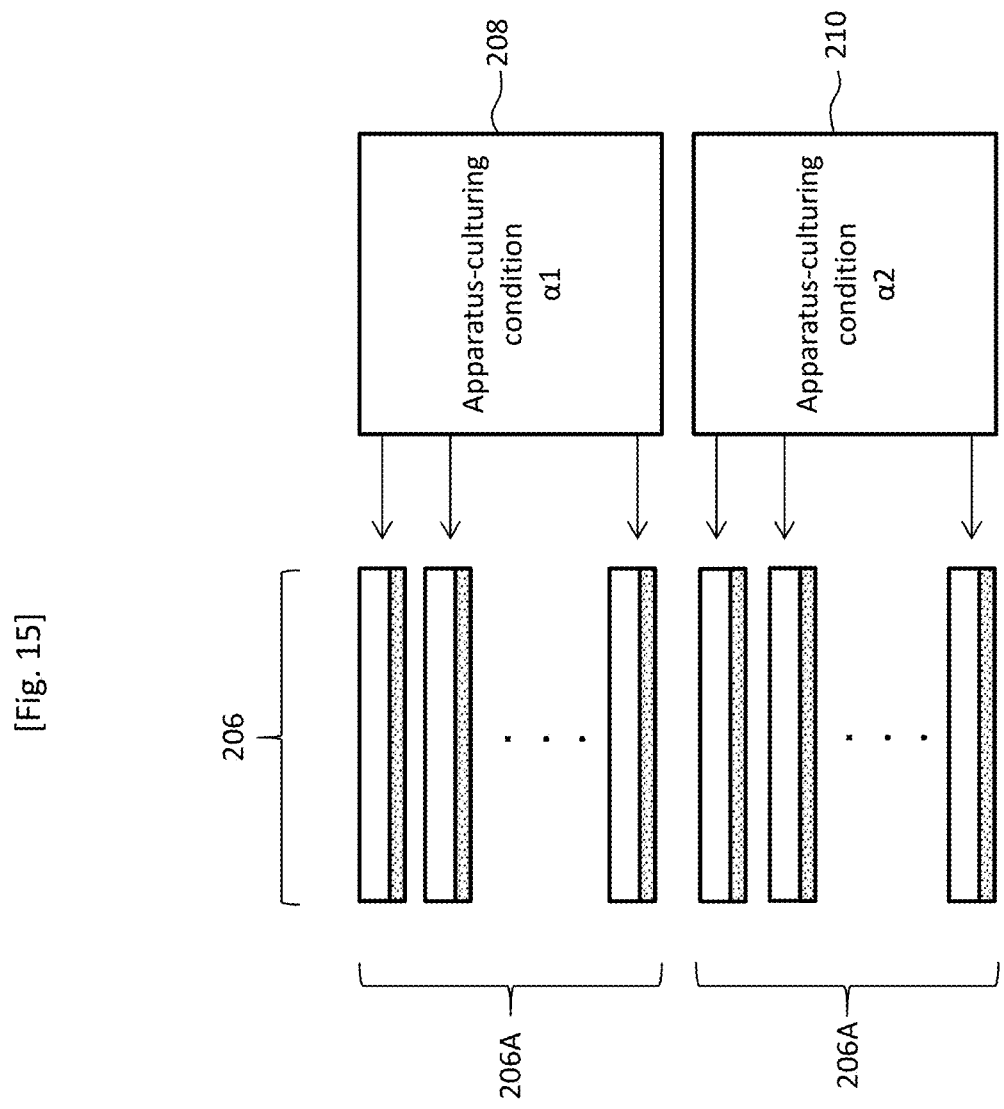

CULTURING APPARATUS SETUP METHOD, ASSISTANCE APPARATUS, AND CULTURING APPARATUS

TECHNICAL FIELD

The present disclosure relates to a culturing apparatus setup method, an assistance apparatus, and a culturing apparatus and, in particular, to a technology to find out a culturing condition to be set in a culturing apparatus.

BACKGROUND ART

In the field of regenerative medicine, cell therapy, development of drugs, or the like, cull culture has been performed. For example, in regenerative medicine companies or the like, the test of cell culture by a hand technique (manual operation) (hereinafter called manual culture) is repeatedly run for a specific cell to find out a culturing condition (hereinafter called a manual culturing condition). After that, the specific cell is repeatedly cultured in accordance with the found-out manual culturing condition, or the specific cell is massively cultured for industrialization.

As an apparatus for eliminating or reducing burdens on manual culture, a culturing apparatus has been known. In the manual culture in which a cell culturing step centering on the exchange of a culture medium has to be often performed, burdens on an operator, specifically, temporal, physical, and mental burdens are so large. The culturing apparatus is an apparatus that automatically performs some or all of the cell culturing step, and is also called an automatic culturing apparatus. In recent years, a mass automatic culturing apparatus capable of massively culturing cells has been put to practical use.

Prior to cell culture in a culturing apparatus (hereinafter called apparatus culture), a culturing condition (hereinafter called an apparatus-culturing condition) is required to be set in the culturing apparatus so that the cell culture can be actually performed by the culturing apparatus. The apparatus-culturing condition includes multiple parameters. In order to culture a cell in the culturing apparatus, appropriate values are required to be set in the parameters. However, appropriate values cannot be found out for some of the parameters unless the apparatus-culturing test is repeatedly run.

Even if a culturist who cultures a cell introduces a culturing apparatus, it can be pointed out that the culturist is possibly unable to make full use of the culturing apparatus. This is because the culturist does not generally have knowledge and experience about apparatus culture even if he/she has knowledge and experience about manual culture. In other words, the culturist probably has a difficulty in finding out an appropriate apparatus-culturing condition for a specific cell by himself/herself even if he/she can find out a manual culturing condition for the specific cell by himself/herself. Even if the culturist can find out the appropriate apparatus-culturing condition, extremely large burdens are put upon the culturist when he/she has to evaluate whether the quality of the result of cell culture by apparatus culture is equivalent to that of the result of the cell culture by manual culture, that is, sameness by himself/herself. The above matters possibly cause a reason why the culturist hesitates to introduce the culturing apparatus.

Meanwhile, most of manufacturers who develop, manufacture, and provide a culturing apparatus have certain knowledge and experience about cell culture but are not specialists in culture. Such culturists have a difficulty in finding out an apparatus-culturing condition for a specific cell to be subjected to apparatus culture (including mass culture) by themselves. There is a situation that it is difficult to provide a dedicated culturing apparatus for culturing a specific cell to the culturists. Generally, the content of a cell culturing step is different for each of the culturists. Therefore, it is difficult to find out a universal manufacturing condition for a culturing apparatus, and the culturing apparatus is required to be customized. Meanwhile, specialized agencies specializing in cell culture having the knowledge and experience of manual culture and apparatus culture for various cells exist. As an example of the specialized agencies, a cell manufacturing entrusted company such as CDMO (Contract Development Manufacturing Organization) has been known.

As a precondition for culturing a specific cell with a specific culturing apparatus, the realization of the mechanism of causing a culturist (a user of a culturing apparatus), a manufacturer, and a specialized agency to cooperate with each other is desired. In other words, in order to further advance the field of regenerative medicine, cell therapy, development of drugs, or the like, save more patients, and reduce medical expenses born by ordinary people, that is, from the viewpoint of a social contribution, the construction of a new business model to cause multiple related entities getting involved in cell culture to organically cooperate with each other has been desired.

Note that Patent Literature 1 discloses a technology to cause multiple manufacturing apparatuses for manufacturing medical products to cooperate with each other. Patent Literature 2 discloses a technology to change a culturing condition in real time on the basis of a past culturing condition. Patent Literatures 1 and 2 do not disclose the mechanism of causing manual culture and apparatus culture to cooperate with each other and an apparatus therefor, and the mechanism of causing multiple related entities getting involved in cell culture to cooperate with each other as a precondition for culturing a specific cell with a specific culturing apparatus and an apparatus therefor.

CITATION LIST

Patent Literature

[PTL 1]
WO 2019/044559
[PTL 2]
Japanese Patent Application Publication No. 2019-41656

SUMMARY OF INVENTION

Technical Problem

A first object of the present disclosure is to realize a mechanism that can provide a culturing apparatus into which a specific apparatus-culturing condition is incorporated to a culturist. A second object of the present disclosure is to provide an assistance apparatus and a test culturing apparatus used in such a mechanism.

Solution to Problem

A culturing apparatus setup method according to the present disclosure includes: an initial-stage determination step of determining an initial-stage test apparatus-culturing condition on a basis of a manual culturing condition found out by a manual culturing test; a testing step of finding out a setting apparatus-culturing condition by running multiple apparatus-culturing tests using a test culturing apparatus with multiple test apparatus-culturing conditions including the initial-stage test apparatus-culturing condition set in the test culturing apparatus; and a setting step of generating a customized culturing apparatus by setting the setting apparatus-culturing condition in a culturing apparatus.

An assistance apparatus according to the present disclosure is an assistance apparatus used to perform a culturing apparatus setup method. The culturing apparatus setup method includes an initial-stage determination step of determining an initial-stage test apparatus-culturing condition on a basis of a manual culturing condition found out by a manual culturing test, a testing step of finding out a setting apparatus-culturing condition by running multiple apparatus-culturing tests using a test culturing apparatus with multiple test apparatus-culturing conditions including the initial-stage test apparatus-culturing condition set in the test culturing apparatus, and a setting step of generating a customized culturing apparatus by setting the setting apparatus-culturing condition in a culturing apparatus. The assistance apparatus includes a database for managing multiple culturing condition pairs, and the respective culturing condition pairs include a manual culturing condition found out in a past and an apparatus-culturing condition found out in a past on a basis of the manual culturing condition. The initial-stage test apparatus-culturing condition is determined through use of the database in the initial-stage determination step.

A culturing apparatus according to the present disclosure is a culturing apparatus set up by a culturing apparatus setup method. The culturing apparatus setup method includes an initial-stage determination step of determining an initial-stage test apparatus-culturing condition on a basis of a manual culturing condition found out by a manual culturing test, a testing step of finding out a setting apparatus-culturing condition by running multiple apparatus-culturing tests using a test culturing apparatus with multiple test apparatus-culturing conditions including the initial-stage test apparatus-culturing condition set in the test culturing apparatus, and a setting step of generating a customized culturing apparatus by setting the setting apparatus-culturing condition in a culturing apparatus. The culturing apparatus includes a storage unit in which the setting apparatus-culturing condition is stored, and a control unit configured to control cell culture in accordance with the setting apparatus-culturing condition.

A test culturing apparatus according to the present disclosure is a test culturing apparatus used in a culturing apparatus setup method. The culturing apparatus setup method includes an initial-stage determination step of determining an initial-stage test apparatus-culturing condition on a basis of a manual culturing condition found out by a manual culturing test, a testing step of finding out a setting apparatus-culturing condition by running multiple apparatus-culturing tests using a test culturing apparatus with multiple test apparatus-culturing conditions including the initial-stage test apparatus-culturing condition set in the test culturing apparatus, and a setting step of generating a customized culturing apparatus by setting the setting apparatus-culturing condition in a culturing apparatus. The test culturing apparatus includes a storage unit in which the multiple test apparatus-culturing conditions are stored, and a control unit configured to control the multiple apparatus-culturing tests in accordance with the multiple test apparatus-culturing conditions.

BRIEF DESCRIPTION OF DRAWINGS

FIG. 1 is a conceptual diagram showing a culturing apparatus setup method according to an embodiment.

FIG. 2 is a block diagram showing a configuration example of a customized culturing apparatus.

FIG. 3 is a perspective view showing an example of the internal mechanism of a culturing unit.

FIG. 4 is a perspective view for describing a culturing container and its swinging.

FIG. 5 is a diagram showing an example of a parameter set as an apparatus-culturing condition.

FIG. 6 is a block diagram showing a test culturing apparatus and an assistance apparatus.

FIG. 7 is a block diagram showing the test culturing apparatus into which the assistance apparatus is incorporated.

FIG. 8 is a block diagram showing a configuration example of the assistance apparatus.

FIG. 9 is a diagram showing a configuration example of a database.

FIG. 10 is a diagram showing a method for using the database.

FIG. 11 is a diagram showing an example of a setting screen.

FIG. 12 is a flowchart showing the culturing apparatus setup method according to the embodiment.

FIG. 13 is a flowchart showing the operation of the assistance apparatus.

FIG. 14 is a diagram for describing registration in the database.

FIG. 15 is a diagram showing a modified example of an apparatus-culturing test.

DESCRIPTION OF EMBODIMENTS

Hereinafter, an embodiment will be described with reference to the drawings.

(1) Summary of Embodiment

A culturing apparatus setup method according to the embodiment includes an initial-stage determination step, a testing step, and a setting step. In the initial-stage determination step, an initial-stage test apparatus-culturing condition is determined on the basis of a manual culturing condition found out by a manual culturing test. In the testing step, multiple apparatus-culturing tests using a test culturing apparatus are run with multiple test apparatus-culturing conditions including the initial-stage test apparatus-culturing condition set in the test culturing apparatus to find out a setting apparatus-culturing condition. In the setting step, the setting apparatus-culturing condition is set in the culturing apparatus to generate a customized culturing apparatus.

According to the above configuration, an initial-stage apparatus-culturing condition is determined on the basis of a proven manual culturing condition. Therefore, the initial-stage apparatus-culturing condition can be made better compared with a case in which the initial-stage apparatus-culturing condition is not founded or referred. Thus, the time before a setting apparatus-culturing condition is found out can be reduced.

According to the above method, for example, it is possible to cause the three entities of a manufacturer who develops, manufactures, and provides a culturing apparatus, a culturist who performs cell culture (particularly mass cell culture) actually using the culturing apparatus, and a specialized agency specializing in the cell culture to organically cooperate with each other to constitute an organization for finding out a setting apparatus-culturing condition. Particularly, it is possible to construct the mechanism of using the knowledge and experience of each of the entities. Note that the above three entities are specified or discriminated from a technical standpoint. Legally or economically, the manufacturer and the specialized agency may belong to the same organization, or a person who performs a manual culturing test and a person who uses a customized culturing apparatus may belong to different organizations.

In the above method, the determinations, manipulations, evaluations, and operations of the respective steps can be basically performed by humans. However, the above method is nothing less than a method for causing multiple entities associated with a cell-culturing technology to get involved in an apparatus-culturing test and manufacturing a culturing apparatus into which a specific apparatus-culturing condition is incorporated after repeatedly running the apparatus-culturing test. Therefore, the above method is a method using the law of nature in its entirety. Further, the above method includes the multiple steps directed to manufacture a culturing apparatus, and the content of each of the steps is specifically defined. Therefore, the above method is not a simple abstract idea but is a method having a specific process as its substance. Moreover, the above method is directed to address a technical problem that a dedicated culturing apparatus cannot be manufactured, and should be definitely differentiated from mental acts or simple business activities in its entirety.

In the embodiment, a manual culturing condition is a condition for culturing a specific cell by manual culture. Respective apparatus-culturing conditions are conditions for culturing a specific cell by apparatus culture. A customized culturing apparatus is a dedicated culturing apparatus that cultures a specific cell. That is, the above method is directed to find out a specific apparatus-culturing condition for culturing a specific cell (or a specific cell type) with a specific culturing apparatus and generate a dedicated culturing apparatus using the specific apparatus-culturing condition.

In the embodiment, multiple culturing condition pairs are managed on a database. The respective culturing condition pairs include a manual culturing condition found out in the past and an apparatus-culturing condition found out in the past on the basis of the manual culturing condition. In the initial-stage determination step, an initial-stage test apparatus-culturing condition is determined through the use of the database. By the association of the apparatus-culturing condition found out on the basis of the manual culturing condition with the manual culturing condition, in other words, by the linkage of the apparatus-culturing condition to the manual culturing condition, it is possible to make full use of accumulated past records to determine a current condition.

In the embodiment, cell information is assigned to each of the culturing condition pairs on the database. In the initial-stage determination step, a culturing condition pair to be referred is selected from among the multiple culturing condition pairs registered in the database in accordance with specified cell information. According to the configuration, it is possible to retrieve the database with a cell (or a cell type) as a retrieval key.

In the embodiment, a found-out manual culturing condition is compared with a manual culturing condition in a culturing condition pair to be referred in the initial-stage determination step. Subsequently, an apparatus-culturing condition in the culturing condition pair to be referred is referred to determine an initial-stage test apparatus-culturing condition. In the above comparison, sameness or similarity may be determined between the manual culturing condition serving as a reference source and the manual culturing condition serving as a reference destination. For example, a culturing condition pair to be referred may be narrowed down on the basis of sameness or similarity.

In the embodiment, a manual culturing condition found out by a manual culturing test is registered in the database as a new manual culturing condition. Further, an apparatus-culturing condition found out by an apparatus-culturing test is registered in the database as a new apparatus-culturing condition. In this case, the new manual culturing condition and the new apparatus-culturing condition are associated with each other to constitute a new culturing condition pair. The respective registrations are performed manually or automatically. Basically, the association or pairing is performed automatically.

In the embodiment, a determination is made as to whether the result of an apparatus-culturing test satisfies requirement specifications for each apparatus-culturing test. When the result of the apparatus-culturing test does not satisfy the requirement specifications, a test apparatus-culturing condition causing the result of the apparatus-culturing test is corrected to set a next test apparatus-culturing condition. On the other hand, when the result of the apparatus-culturing test satisfies the requirement specifications, the test apparatus-culturing condition causing the result of the apparatus-culturing test is set as a setting apparatus-culturing condition. The requirement specifications may be set on the basis of the result of a manual culturing test. For example, the requirement specifications may be set on the basis of a production rate, a differentiation rate, or the like obtained as the result of a manual culturing test.

In the embodiment, a test culturing apparatus and a customized culturing apparatus are physically different apparatuses that satisfy the sameness of specifications. When an apparatus-culturing test is run with an apparatus-culturing condition in one culturing apparatus set in another culturing apparatus, it can be said that the sameness of specifications is satisfied if cell culture can be substantially reproduced (an equivalent result can be obtained) by the other culturing apparatus. The physical specifications of a test culturing apparatus and a culturing apparatus provided to a user may be completely the same.

An assistance apparatus according to the embodiment is an apparatus used to perform a culturing apparatus setup method, and includes a database for managing multiple culturing condition pairs. The respective culturing condition pairs include a manual culturing condition found out in the past and an apparatus-culturing condition found out in the past on the basis of the manual culturing condition. In an initial-stage determination step included in the culturing apparatus setup method, an initial-stage test apparatus-culturing condition is determined through the use of the database. In the culturing apparatus setup method, multiple apparatus-culturing tests are run sequentially or in parallel with each other, while multiple test apparatus-culturing conditions are set sequentially or in parallel with each other. The change or re-determination of the test apparatus-culturing conditions may be assisted by the assistance apparatus.

The assistance apparatus according to the embodiment includes: a first registration unit that registers a manual culturing condition found out by a manual culturing test in the database as a new manual culturing condition; and a second registration unit that registers an apparatus culturing condition found out by multiple apparatus-culturing tests in the database as a new apparatus-culturing condition. By the association of the new manual culturing condition and the new apparatus-culturing condition, a new culturing condition pair is constituted.

A culturing apparatus according to the embodiment is a culturing apparatus set up by a culturing apparatus setup method. The culturing apparatus includes: a storage unit in which a setting apparatus-culturing condition is stored; and a control unit that controls cell culture in accordance with the setting apparatus-culturing condition. The setting apparatus-culturing condition stored in the storage unit may be protected so as not to be rewritten without authority.

The culturing apparatus according to the embodiment includes: a swinging table on which a culturing container is mounted; and a swinging mechanism that swings the swinging table about an x-axis and a y-axis that are orthogonal to each other. Respective test apparatus-culturing conditions and a setting apparatus-culturing condition includes an x-axis swinging condition and a y-axis swinging condition for stipulating the swinging of the swinging table. In the culturing apparatus including the swinging table, the x-axis swinging condition and the y-axis swinging condition become important parameters to culture a specific cell.

A test culturing apparatus according to the embodiment is an apparatus used in a culturing apparatus setup method. The test culturing apparatus includes: a storage unit in which multiple test culturing conditions are stored sequentially or simultaneously; and a control unit that controls multiple apparatus-culturing tests in accordance with the multiple test culturing conditions. The test culturing apparatus includes a physical configuration that satisfies sameness with respect to the physical configuration of a customized culturing apparatus.

(2) Details of Embodiment

FIG. 1 conceptually shows the culturing apparatus setup method according to the embodiment. The method is applied to an organization including manufacturer 10, a culturist (user) 12, and a specialized agency 14 or performed by the organization. A cell to be cultured is, for example, a cell of a human or an animal. A multipotential stem cell (iPs cell), a cell differentiated from a multipotential stem cell, or the like may be a cell to be cultured. In regenerative medicine, cell therapy, development of drugs, or the like, it is required that mass cells are stably cultured. A scheme or a model shown in FIG. 1 is designed with such a need as a backdrop.

The manufacturer 10 is a business operator who develops, manufactures, and provides a culturing apparatus. The culturing apparatus according to the embodiment is an apparatus that automatically cultures mass cells. The culturist 12 is a business operator who performs cell culture using the culturing apparatus, and is, for example, a medical institution such as a regenerative medicine company. The culturist 12 is assumed to have capabilities and facilities to perform manual culture but is a business operator having the need of performing apparatus culture (including mass culture) for at least a specific cell. The specialized agency 14 is, for example, a business operator who specializes in cell culture. The concept of the specialized agency 14 can include colleges or research agencies that perform cell culture. For example, an apparatus sales contract or the like exists between the culturist 12 and the manufacturer 10, and a culturing test commission contract or the like exists between the manufacturer 10 and the specialized agency 14.

Note that the culturist 12 may be divided into a section 12A that performs manual culture and a section 12B that performs apparatus culture actually using a culturing apparatus. Legally or economically, the section 12A may belong to another entity, and a part of the manufacturer 10 may correspond to the specialized agency 14.

In the embodiment, a manual culturing test 24 for culturing a specific cell is repeatedly run as a precondition for performing apparatus culture for the specific cell by the culturist 12. On this occasion, a manual culturing condition is sequentially changed. By way of such a process, a manual culturing condition 26 serving as an established manual culturing protocol is found out. Note that the manual culturing condition 26 includes a manual culturing condition determined and selected by the culturist 12 as being significant on the basis of information such as articles described in public information.

Generally, the culturist 12 has knowledge and experience to find out a manual culturing condition but does not have knowledge and experience enough to perform apparatus culture using a specific culturing apparatus. Accordingly, even with the introduction of a universally-available culturing apparatus (non-customized culturing apparatus), the culturist 12 faces the risk of being unable to make full use of the apparatus. In view of this, the cooperation between the manufacturer 10, the culturist 12, and the specialized agency 14 is developed in the method according to the embodiment. Thus, it is possible to generate the customized culturing apparatus 44 that cultures a specific cell and provide the customized culturing apparatus 44 to the culturist 12. Hereinafter, the generation and provision of the customized culturing apparatus will be specifically described.

A test culturing apparatus (hereinafter also called a test apparatus) 18 is provided from the manufacturer 10 to the specialized agency 14. The test apparatus 18 is provided in a manner such as lease or purchase 16. The test apparatus 18 is basically the same apparatus as the customized culturing apparatus (hereinafter also called a final product depending on circumstances) 44 basically provided from the manufacturer 10 to the culturist 12. For example, the model number of the test apparatus 18 is the same as that of the final product 44. That is, the physical specifications of the test apparatus 18 are the same as those of the final product 44. The configuration of the final product 44 and the configuration of the test apparatus 18 are made uniform so that at least cell culture in the test apparatus 18 can be reproduced in the final product 44.

In the embodiment, an assistance apparatus 32 and a data logger 42 that will be described later are also provided from the manufacturer 10 to the specialized agency 14. The assistance apparatus 32 is used by the specialized agency 14. The registration of data in the assistance apparatus 32 is performed by the specialized agency 14 but may be performed by the manufacturer 10 (see symbol 10A). The data logger 42 is an apparatus that accumulates various data for future use or abnormality analysis. The data logger 42 may be incorporated into the test apparatus 18. The maintenance of the data logger 42 is performed by, for example, the manufacturer 10.

The manual culturing condition 26 found out by the manual culturing test 24 is delivered to the specialized agency 14 via the manufacturer 10 or directly as electronic data or a physical document. The manual culturing condition 26 includes multiple elements for culturing a specific cell by a hand technique. For example, the manual culturing condition 26 can include the number of culturing days for stipulating a culturing protocol, the type of a culture medium, the liquid amount of a culture medium, the exchange time of a culture medium, the liquid amount of a cell suspension, the introduction time of a cell suspension, the type of a reagent, the liquid amount of a reagent, the introduction time of a reagent, or the like. The manual culturing condition 26 may also include a temperature, a culturing container type, a seeding condition, or the like.

Note that manual culture and apparatus culture are relative concepts, the former representing culture mainly performed by a hand technique, the latter representing culture mainly performed by an apparatus. Some steps in the manual culture may be performed by an apparatus, and some steps in the apparatus culture may be performed by a hand technique. However, in the culturing apparatuses 18 and 44 according to the embodiment, all steps constituting a culturing process are basically automatically performed.

In the specialized agency 14, an apparatus-culturing test 20 is repeatedly run for a specific cell. A determination 22 of an apparatus-culturing condition (test apparatus-culturing condition) is made prior to each apparatus-culturing test 20, and a determined apparatus-culturing condition 34 is set in the test apparatus 18. The apparatus-culturing condition includes multiple parameters for stipulating the operation of the test apparatus 18.

Specifically, the multiple parameters can include the number of used culturing containers, the liquid amount of a culture medium, the liquid feeding speed of a culture medium, the exchange time of a culture medium, the liquid amount of a cell suspension, the liquid feeding speed of the cell suspension, the introduction time of a cell suspension, the liquid amount of a reagent, the introduction time of a reagent, the feeding amount of gas, the feeding time of gas, the swinging angle of a culturing container, the swinging speed of a culturing container, the number of swinging times of a culturing container, or the like. Moreover, the parameters may also include the type of a culture medium, the type of a reagent, a coating temperature, a preheating temperature, a culturing temperature, a liquid discharging amount, a liquid discharging speed, or the like. Note that items and numerical values shown in the present specification are given only for illustration purpose.

The multiple parameters constituting the apparatus culturing condition can be classified into, for example, three categories. Parameters classified into a first category are basically parameters that can be determined in advance by the manufacturer 10. For example, the manufacturer 10 is well acquainted with a liquid feeding speed or a liquid discharging speed suitable for a culturing container manufactured or selected by himself/herself. Such parameters can belong to the first category. The parameters belonging to the first category may be determined with reference to the currently-obtained manual culturing condition 26 and a past apparatus-culturing condition provided by the assistance apparatus 32.

Parameters classified into a second category are basically parameters that can be automatically determined by the specialized agency 14 itself. For example, it is often the case that the liquid amount of a culture medium per culturing container can be empirically determined on the basis of the shape, capacity, or the like of the culturing container. Such a parameter can belong to the second category. The parameters belonging to the second category may be determined with reference to the currently-obtained manual culturing condition 26 and a past apparatus-culturing condition provided by the assistance apparatus 32.

Parameters classified into a third category are basically parameters determined by the repetition of the apparatus-culturing test 20. For example, the optimum exchange cycle of a culture medium can be changed according to various conditions such as the type of a cell, the shape of a culturing container, and various liquid amounts. Such a parameter can be classified into the third category. The parameters belonging to the third category may be determined with reference to the currently-obtained manual culturing condition 26 and a past apparatus-culturing condition provided by the assistance apparatus 32.

The three categories described above are given for illustration purpose. Multiple categories may be defined in terms of other viewpoints. Each parameter may be managed without being classified.

In the embodiment, a test apparatus-culturing condition, particularly, an initial-stage test apparatus-culturing condition is determined by the specialized agency 14 on the basis of the manual culturing condition 26 found out by the culturist 12, knowledge and experience 28 of the manufacturer 10, knowledge and experience 30 of the specialized agency 14, and an apparatus-culturing condition found out in the past.

Note that default values may be set in advance in some parameters of the test apparatus 18 provided to the specialized agency so that the knowledge and experience 28 of the manufacturer 10 are delivered to the specialized agency 14. Alternatively, the default values may be delivered to the specialized agency apart from the provision of the test apparatus 18.

The determined initial-stage apparatus-culturing condition is set in the test apparatus 18 (see symbol 34). After that, the apparatus-culturing test 20 is run by the test apparatus 18 in accordance with the initial-stage apparatus-culturing condition. An evaluation 36 is made for the result of the apparatus-culturing test 20 to determine whether the result of the apparatus-culturing test satisfies requirement specifications 38 from the culturist 12. When the result of the apparatus-culturing test does not satisfy the requirement specifications 38, the apparatus-culturing condition is changed and then set in the test apparatus 18 (see symbol 34). After that, the apparatus-culturing test 20 is run again. The apparatus-culturing test 20 is repeatedly run, while the apparatus-culturing conditions are sequentially changed. In the change of the apparatus-culturing condition, a parameter belonging to the third category is, for example, changed. However, a parameter belonging to other categories may be changed.

When the result of the m-th apparatus-culturing test satisfies the requirement specifications, the m-th apparatus-culturing condition 39 employed in the m-th apparatus-culturing test is delivered from the specialized agency 14 to the manufacturer 10 as, for example, electronic data or a physical document. m is an integer of 1 or more and is generally an integer of 3 or more. The apparatus-culturing condition 39 is setup data for culturing a specific cell with a specific cell apparatus. The manufacturer 10 installs or incorporates the apparatus-culturing condition 39 into a culturing apparatus (culturing apparatus in which a setting has not been completed) to perform setup 40 of the culturing apparatus. A culturing apparatus 44 thus generated, that is, a customized culturing apparatus 44 is provided from the manufacturer 10 to the culturist 12. After that, the culturist 12 performs apparatus culture (including mass culture) for a specific cell using the customized culturing apparatus 44.

During or after a reference to the manual culturing condition 26, the manual culturing condition 26 is registered in the assistance apparatus 32. Meanwhile, when the result of the m-th apparatus-culturing test satisfies the requirement specifications, the m-th apparatus-culturing condition 41 employed in the m-th apparatus-culturing test is registered in the assistance apparatus 32. The assistance apparatus 32 has a database that will be described later, and multiple culturing condition pairs are stored in the database. Each of the culturing condition pairs includes a manual culturing condition for culturing a specific cell and an apparatus-culturing condition for culturing the specific cell found out on the basis of the manual culturing condition. By the association of the manual culturing condition and the apparatus-culturing condition, it is possible to immediately specify the latter from the former.

The test apparatus 18 is provided with multiple sensors. Further, the test apparatus 18 is provided with a movable camera that captures the inside of respective culturing containers. The data logger 42 is used to accumulate multiple detection values or multiple images acquired in a culturing test process or acquired at the end of a test. Information accumulated in the data logger 42 can be a learning data for causing an estimation device that automatically estimates an apparatus culturing condition to perform machine learning. The accumulated information can be used for the evaluation of the quality of a cell. Abnormality analysis may be made on the basis of the accumulated information, or the accumulated information may be used as data for maintenance.

As described above, the manufacturer 10, the culturist 12, and the specialized agency 14 are caused to organically cooperate with each other to find out a specific apparatus-culturing condition for culturing a specific cell with a specific culturing apparatus through the use of the knowledge and experience of the respective entities in the method according to the embodiment. Thus, a dedicated culturing apparatus capable of culturing a specific cell can be provided to the culturist 12. In other words, the culturist 12 can reduce a risk at the introduction of a culturing apparatus. Further, since a reference to the manual culturing condition 26 and a past apparatus culturing condition is allowed in the determination of an initial-stage apparatus-culturing condition, the possibility of making the initial-stage apparatus-culturing condition fine from the start is increased. Thus, it is possible to reduce the time required to repeatedly run the apparatus-culturing test 20.

Note that in FIG. 1, the setup 40 of a culturing apparatus may be performed by the manufacturer 10 in the facility of the culturist 12 after the culturing apparatus is precedingly provided from the manufacturer 10 to the culturist 12. In such a case as well, the fact that the customized culturing apparatus 44 is provided to the culturist 12 remains the same. The setup of the embodiment is not limited to the above. For example, the setup can include the reset of an apparatus-culturing condition. When the database 106 of the assistance apparatus 32 that will be described in detail below is updated, the apparatus-culturing condition of a provided culturing apparatus is reset. There is also a case that the apparatus-culturing condition of a culturing apparatus is reset to culture a different cell in response to a request from the culturist 12. Such resets can correspond to the above setup.

With the assistance apparatus 32 configured as a cloud (information processing system) on the Internet, information for assisting the determination of an apparatus-culturing condition may be provided to multiple specialized agencies 14 as a cloud service. The test apparatus 18 is desirably configured as an apparatus physically different from a customized culturing apparatus. However, it is also assumed as a modified example that the test apparatus 18 is used as the customized culturing apparatus 44 as it is.

FIG. 2 shows the configuration of the customized culturing apparatus 44 as an example. In the shown configuration example, the culturing apparatus 44 includes a control unit 46, a reagent unit 48, and a culturing unit 50. Each of the units 46, 48, and 50 is a physical facility, has a case as its housing, and accommodates multiple equipment in the case.

The reagent unit 48 has multiple culture medium bottles, multiple cell suspension bottles, multiple reagent bottles, multiple pumps, a liquid feeding mechanism, a liquid discharging mechanism, or the like. The culturing unit 50 includes an internal mechanism. The internal mechanism has multiple stages arranged side by side in a perpendicular direction at a fixed interval and multiple culturing containers mounted on the multiple stages. The internal mechanism also includes a swinging mechanism to swing each of the culturing containers. In a seeding step and before the discharge of a liquid, the swinging mechanism operates.

The control unit 46 has an operation control unit 52, a storage unit 54, an input device 56, and a display device 58. The operation control unit 52 has a processor that operates in accordance with a program. The processor is, for example, a CPU. In the storage unit 54, a program to be given to the processor is stored, and a parameter set constituting an apparatus-culturing condition is stored. The parameter set is data installed by the setup described above. The operation control unit 52 controls the automatic culture of a cell in accordance with the parameter set. The parameter set is also data for stipulating the operation sequence of the culturing apparatus 44.

In the parameter set, a main portion is subjected to protect processing, while the value of the rest portion can be changed as occasion demands. Note that the change or the like of the main portion subjected to the protect processing can be basically performed by the manufacturer 10. The parameter set may be entirely subjected to the protect processing.

The input device 56 is an input device used for the stop of the activation of a culturing apparatus, the setting of an operating condition, or the like. On the display device 58, a current apparatus situation or a currently-set parameter set is displayed. The input device 56 and the display device 58 may be integrated to constitute a touch panel.

FIG. 3 schematically shows an internal mechanism 50A provided inside the culturing unit as an example. An X-direction is a first horizontal direction, a Y-direction is a second horizontal direction, and a Z-direction is a perpendicular direction. These directions are perpendicular to each other.

In the shown configuration example, the internal mechanism 50A has multiple stages 66 arranged side by side in the Z-direction. The multiple stages 66 function as multiple seats, and multiple culturing containers 68 are mounted on the multiple stages 66. In the shown configuration example, the multiple stages 66 are held by three columns 60, 62, and 64 so as to be movable. Each of the columns 60, 62, and 64 includes multiple intermediate members and multiple joints 72 that are alternately arranged. The respective joints 72 hold the respective stages 66 so as to be movable.

At the lower parts of the three columns 60, 62, and 64, three elevating mechanisms 74A, 74B, and 74C are provided, respectively. By the three elevating mechanisms 74A, 74B, and 74C, the three columns 60, 62, and 64 can be caused to separately advance or retreat in a vertical direction. Thus, the posture of the respective stages 66 is changed, and the posture of the respective culturing containers 68 is also changed accordingly. By the cooperation of three elevating mechanisms 74A, 74B, and 74C, two swinging movements that will be described below are created. By the columns 60, 62, and 64 and the elevating mechanisms 74A, 74B, and 74C, a swinging mechanism is constituted.

FIG. 4 shows one stage 66 and one culturing container 68 held by the stage 66. FIG. 4 shows an x-axis and a y-axis. The x-axis passes through the center in the longitudinal direction of the culturing container 68 and is parallel to the short direction of the culturing container 68. The y-axis passes through the center in the short direction of the culturing container 68 and is parallel to the longitudinal direction of the culturing container 68. When the stage 66 is in a horizontal posture, the x-axis becomes parallel to the X-direction and the y-axis becomes parallel to the Y-direction. Note that a mode in which the x-axis and the y-axis pass through positions lower or higher than the culturing container 68 may be employed.

In the embodiment, the culturing container 68 can be caused to swing about the x-axis (see θx) and swing about the y-axis (see θy). By the combination of the two swinging movements after the seeding of a cell, it is possible to widely and uniformly spread the seeded cell in the culturing container 68. Further, when a culture medium is sucked in a culture medium exchange step, it is possible to keep a cell group at a distance from a suction port using the swinging movement about the x-axis. In a culturing process, the culturing container is in a stationary state. The culturing container 68 has a flat plate shape extending in the two horizontal directions (longitudinal and short directions). Note that other culturing containers having different sizes or shapes may be used depending on the specifications or conditions of a required cell.

FIG. 5 shows a parameter set 76 constituting an apparatus-culturing condition as an example. FIG. 5 also shows multiple steps 80 and multiple parameter names 82. The parameter set 76 includes multiple parameters 78. Generally, the substance of each of the parameters 78 is a numerical value, but the substance may be a symbol or a character string. The multiple steps 80 include, for example, a pre-processing step and a culturing step. Alternatively, the multiple steps 80 include a coating step, a culture medium liquid feeding step, a cell seeding step, a culture medium exchange step, or the like.

In the embodiment, the multiple parameters 76 constituting the parameter set 76 are classified into the three categories as described above. Parameters shown by symbol 84 are parameters belonging to the first category. Parameters shown by symbol 86 are parameters belonging to the second category. Parameters shown by symbol 88 are parameters belonging to the third category.

FIG. 6 shows a configuration example of the test culturing apparatus (test apparatus) 18. The test apparatus 18 has the same configuration as that of a culturing apparatus (final product) provided to a user. That is, the test apparatus 18 has a control unit 90, a reagent unit 92, and a culturing unit 94. The control unit 90 has an operation control unit 96, a storage unit 98, an input device 100, and a display device 102. Since the configuration of the culturing apparatus is described above with reference to FIG. 2, its description is omitted here.

A tester (person who determines a test apparatus-culturing condition) can refer to a past culturing condition using the assistance apparatus 32. Specifically, for example, by giving information 103 for specifying a cell or a cell type to the assistance apparatus 32 as a retrieval key and retrieving a culturing condition pair, the tester can specify a culturing condition pair corresponding to the same cell or cell type. Subsequently, a current manual culturing condition provided by the user is compared with a past manual culturing condition in the culturing condition pair to be referred. In consideration of the result of the comparison, the tester refers to a past apparatus-culturing condition in the culturing condition pair to be referred.

The tester determines an initial-stage apparatus-culturing condition, while referring to the current manual culturing condition and the past apparatus-culturing condition. The tester inputs the initial-stage apparatus-culturing condition to the test apparatus 18 using the input device 100. The assistance apparatus 32 may perform the setting of the initial-stage apparatus-culturing condition and input the set apparatus-culturing condition to the test apparatus 18 as electronic data.

FIG. 7 shows a modified example of the test apparatus. A test apparatus 18A basically has the same configuration as that of the test apparatus 18 shown in FIG. 6. However, in the shown modified example, an assistance apparatus 32A is incorporated into the test apparatus 18A. The assistance apparatus 32A has the same function as that of the above assistance apparatus. According to the configuration, the management and handling of data are facilitated.

FIG. 8 shows a specific configuration example of the assistance apparatus. The assistance apparatus has a processing unit 104 and a database (DB) 106. The substance of the DB 106 is a storage unit. The processing unit 104 functions as a retrieval unit and a registration unit. The processing unit 104 has a processor that performs information processing in accordance with a program. The processor includes, for example, a CPU. An input device 108 and a display device 112 are connected to the processing unit 104. A retrieval condition is input through the use of the input device 108. A retrieval result is displayed on the display device 112.

For registration in the DB 106, registration data 110 is given to the processing unit 104 via a data line. Further, when retrieval result data 114 by the processing unit 104 is used as it is to determine or set an apparatus-culturing condition, the retrieval result data 114 is transferred from the processing unit 104 to the culturing apparatus via the data line. The DB 106 includes a special structure, which will be described in detail below.

FIG. 9 shows multiple tables 116-1 to 116-$n$ stored in the DB 106. $n$ is an integer of 1 or more and is an integer of 2 or more in a shown example. Each of the tables 116-1 to 116-$n$ basically has the same structure. Hereinafter, the content of the table 116-1 will be described.

Information 118 for specifying a cell or a cell type is assigned to the table 116-1. Further, the table 116-1 has a manual culturing condition 120 and an apparatus-culturing condition 122. Both conditions are associated with each other. That is, the conditions are linked to each other. The apparatus-culturing condition 122 is found out by repeatedly running an apparatus-culturing test on the basis of the manual culturing condition 120. The manual culturing condition 120 and the apparatus-culturing condition 122 constitute one culturing condition pair together.

The substance of the manual culturing condition 120 is a parameter set 124. The parameter set 124 includes multiple elements for stipulating a manual culturing protocol. The substance of the apparatus-culturing condition 122 is a parameter set 126. The parameter set 126 includes multiple parameters serving as apparatus-culturing conditions. As described above, the multiple parameters are roughly classified into parameters 84A belonging to the first category, parameters 86A belonging to the second category, and parameters 88A belonging to the third category in the embodiment.

Using the retrieval of an apparatus-culturing condition based on a manual culturing condition as a unit, a culturing condition pair is generated. As the retrieval is repeatedly performed, culturing condition pairs are accumulated in the DB 106. If one or more culturing condition pairs worth referring can be referred prior to an apparatus-culturing test for a certain cell, the possibility of determining a finer apparatus-culturing condition as early as possible is increased together with the use of the knowledge of a test organization. This results in an advantage that the time for retrieving an optimum solution is reduced, and consequently leads to a reduction in the time before a cultured cell is provided to a patient who really needs the cell in the field of regenerative medicine, cell therapy, development of drugs, or the like.

FIG. 10 conceptually shows the use of the DB 106. As described above, the DB 106 includes the multiple tables. Symbol 130 shows a manual culturing condition found out by a manual culturing test for a specific cell. For example, by retrieving the database with a specific cell as a retrieval key (see symbol 134), a tester extracts a table 132 corresponding to the same cell. The table 132 has cell information 136 for specifying the cell. Note that one or more tables generating high similarity may be displayed as retrieval results through the computation of similarity between the manual culturing condition 130 and manual culturing conditions in the respective tables. In this case, correlation value computation, inter-vector norm computation, or the like can be used to compute the similarity. Further, a table range in the DB 106 in which a reference can be made may be restricted depending on the culturist 12 who provides the manual culturing condition 120.

After the retrieval, the tester compares the manual culturing condition 130 with a manual culturing condition 138 in the specific table 132. After that, the tester refers to an apparatus-culturing condition 140 in the specific table 132 (see symbol 142). While referring to the apparatus-culturing condition 140, the tester determines a test apparatus-culturing condition 144 to be set in the test apparatus.

FIG. 11 shows a screen for setting a test apparatus-culturing condition as an example. The screen is displayed on the display device of the test apparatus or the display device of the assistance apparatus. In the shown example, manual culturing conditions serving as original conditions found out by a manual culturing test are displayed in a list form on the left of the screen 150. Culturing condition pairs 154 specified by retrieval are displayed in a list form at the center of the screen 150. The culturing condition pairs 154 include manual culturing conditions 154A, and also include apparatus-culturing conditions 154B found out on the basis of the manual culturing conditions 154A. Apparatus-culturing conditions to be set in the culturing apparatus are displayed in a list form on the right of the screen 150.

In the shown example, the screen 150 includes a copy button 162, an input button 164, and a reset button 166. When the copy button 162 is operated after the selection of a specific cell 158 from among the apparatus-culturing conditions 154B and the selection of a specific cell 160 from among the apparatus-culturing conditions 156 by the movement of two cursors, a numerical value in the cell 158 is automatically copied to the cell 160. The input button 164 is a button operated to directly input a numerical value in a state in which a specific cell among the apparatus-culturing conditions 156 is selected by a cursor. The reset button 166 is a button operated to cancel a numerical value in a cell in a state in which the specific cell among the apparatus-culturing conditions 156 is selected by a cursor.

The above description is shown as an example. The content of the screen is desirably set so that an apparatus-culturing condition can be properly determined with reference to a found-out manual culturing condition, a past apparatus-culturing condition, or the like.

FIG. 12 shows the culturing apparatus setup method according to the embodiment as a flowchart. S100 shows a process to be performed by a culturist, S102 shows a process to be performed by a manufacturer, and $S103_{[A1]}$ shows a process to be performed by a specialized agency.

In S10, a test culturing apparatus (test apparatus) is provided (lease or purchase) from the manufacturer to the specialized agency. S12 shows the step of acquiring the test apparatus. In S14, a manual culturing condition is set by the user. In S16, a manual culturing test is run. In S18, the result of the manual culturing test is evaluated. On this occasion, the evaluation includes various evaluation items. The evaluation items can include, for example, a production rate and a differentiation rate. When it is determined that the result of the manual culturing test is inappropriate in the evaluation of S18, the processing of S14 is performed again via S20. While the setting and change of the manual culturing condition is repeatedly performed in S14, the manual culturing test is repeatedly run in S16. When the result of the manual culturing test is satisfactory in the evaluation of S18, the manual culturing condition set at that time is assumed as the best manual culturing condition.

In S22, the found-out manual culturing condition is provided from the user to the manufacturer. Moreover, in S24, the manual culturing condition is provided from the manufacturer to the specialized agency. In S26, some parameters are provided from the manufacturer to the specialized agency. However, the processing of S26 is omitted when the parameters have been preset in the test apparatus. In S28A, an apparatus-culturing condition is initially set. On this occasion, the found-out manual culturing condition is referred, and the DB of the assistance apparatus is retrieved (see S30). In S32, an apparatus-culturing test is run in accordance with the set apparatus-culturing condition.

In S34, the result of the apparatus-culturing test is evaluated. In this case, a determination is made as to whether the result of the apparatus-culturing test satisfies requirement specifications from the culturist. For example, when it is assumed that a production rate showing the result of the manual culturing test is a reference value, a production rate is required to be 80% or more of the reference value. Alternatively, when it is assumed that a differentiation rate showing the result of the manual culturing test is a reference value, a differentiation rate is required to be 80% or more of the reference value. The above reference values are given as examples, and reference values are stipulated by the culturist for each characteristic of a cell.

When it is determined that the result of the apparatus-culturing test does not satisfy the requirement specifications in S34, the apparatus-culturing condition is reset (changed) in S28B via S36. After that, the processing of S32 and S34 is performed again. When it is determined that the result of the apparatus-culturing test satisfies the requirement specifications in S34, the apparatus-culturing condition set at the time point is assumed as a setting apparatus-culturing condition. In S40, the setting apparatus-culturing condition is notified from the specialized agency to the manufacturer.

In S46, the setting apparatus-culturing condition is set in the culturing apparatus by the manufacturer to set up the culturing apparatus. Thus, a customized culturing apparatus for culturing a specific cell, that is, a dedicated culturing apparatus is generated. In S48, the customized culturing apparatus is provided from the manufacturer to the culturist. In S50, the manufacturer acquires the customized culturing apparatus. After S50, apparatus culture (including mass culture) for a cell is performed by the customized culturing apparatus.

In S42, the setting apparatus-culturing condition is registered in the database. On the database, the setting apparatus-culturing condition is associated with the best manual culturing condition serving as an original condition to constitute a culturing condition pair.

FIG. 13 shows the operation of the assistance apparatus, specifically, the operation or control of the processor of the assistance apparatus as a flowchart. In S60, a retrieval condition is received from a tester who runs an apparatus-culturing test. The retrieval condition is input through the use of an input device. As a retrieval key, information for discriminating a cell or a cell type is, for example, input. Information for specifying a culture medium or the type of a regent used in a manual culturing test or the like may be input as a retrieval key. Multiple information items relating to the manual culturing test may be combined together to constitute a retrieval key. Information transmitted from a culturist or a manufacturer may be imported in the assistance apparatus via a network.

In S62, the database is retrieved in accordance with the received retrieval condition. That is, a table satisfying the retrieval condition, that is, a culturing condition pair is retrieved. In S64, the content of the hit culturing condition pair is displayed on a screen. When multiple culturing condition pairs are hit, the content of a culturing condition pair selected from a list may be displayed after the list showing the multiple culturing condition pairs is displayed.

In S62, the tester determines whether to perform the retrieval again. When an input for performing the retrieval again is received from the tester, the step of S60 and the subsequent steps are repeatedly performed. In S62, the routine ends when an input for instructing the end of the retrieval is received from the tester.

After S62, the step of displaying a setting screen for setting an apparatus-culturing condition may be performed. Alternatively, a retrieval result may be transferred from the processor of the assistance apparatus to the processor of the culturing apparatus and displayed on the setting screen as shown in FIG. 11. In any way, a user interface that enables the input of an apparatus-culturing condition while referring to past records is desirably constructed.

FIG. 14 schematically shows the registration of a culturing condition in the database. Prior to or during an apparatus-culturing test, a manual culturing condition 170 found out by a manual culturing test is registered in the database 106 (see symbol 172). A registration operation is performed by a staff or a tester of the specialized agency but may be automated. Some but not all of the manual culturing condition 170 may be registered. Generally, in the registration of the manual culturing condition 170, information for specifying a cell to be cultured is also registered.

Meanwhile, an apparatus-culturing condition 176 found out on the basis of the manual culturing condition 170 is registered in the database 106 (see symbol 178). The apparatus-culturing condition 176 includes multiple parameters for stipulating the operation of a culturing apparatus. As described above, the multiple parameters include parameters 184 belonging to the first category, parameters 186 belonging to the second category, and parameters 188 belonging to the third category. All the parameters are basically registered, but some of the parameters may be registered. The registration of the apparatus-culturing condition 176 is performed by the tester but may be automated. In the registration of the apparatus-culturing condition 176, information for specifying a cell to be cultured may be registered, or the registration may be omitted.

A manual culturing condition 170A and an apparatus-culturing condition 176A registered in the database are associated with each other (see symbol 180) to constitute a culturing condition pair 182. The manual culturing condition 170A and the apparatus-culturing condition 176A may be physically or logically associated with each other. The culturing condition pair 182 includes information 174 for specifying a cell or a cell type, or such information 174 is added to the culturing condition pair 182. A culturing condition pair is added to the database 106 for each retrieval of an apparatus-culturing condition, and the record of apparatus culture based on manual culture is accumulated in the database 106. Accordingly, it is expected that accuracy in determining a condition using the assistance apparatus is increased.

During the registration of the manual culturing condition 170, a manual culturing result 190 may be registered in association with the manual culturing condition 170. For example, numerical value information 192 or an image 194 may be registered in the database 106. Similarly, during the registration of the apparatus-culturing condition 176, an apparatus-culturing result 198 may be registered in association with the apparatus-culturing condition 176. For example, numerical value information 200 or an image 202 may be registered in the database 106.

FIG. 15 shows a modified example of an apparatus-culturing test run by the test apparatus. In the culturing unit of the test apparatus, a culturing container row 206 including multiple culturing containers is provided. Specifically, each of the culturing containers is held by an internal mechanism so as to be swingable. Each of the culturing containers is connected to multiple pumps and multiple bottles provided in a reagent unit via a pipe set.

For example, the culturing container row 206 may be divided into the two groups of a first group 206A and a second group 208, and different apparatus-culturing conditions may be applied to the groups. Specifically, an apparatus-culturing condition ($\alpha$1) 208 may be applied to the first group 206A, and an apparatus-culturing condition ($\alpha$2) 210 may be applied to the second group. The swinging conditions of the first group 206A and the second group 208 are required to be made uniform, but it is possible to make the types, amounts, feeding speeds of reagents supplied to the groups different. By running two apparatus-culturing tests in parallel with each other in accordance with two apparatus-culturing conditions that are similar and not the same, it is possible to reduce a total apparatus-culturing test period.

Note that the employment of a configuration in which a completely-independent apparatus-culturing condition can be applied to each cell container$_{[42]}$ is also assumed. In order to avoid the complexity of the test apparatus, the employment of a configuration in which multiple apparatus-culturing conditions partially common to each other are accepted is desired.

According to the above configuration, an initial-stage apparatus-culturing condition is determined on the basis of a proven manual culturing condition. Therefore, the initial-stage apparatus-culturing condition can be made better compared with a case in which the initial-stage apparatus-culturing condition is not referred. Thus, the number of apparatus-culturing tests can be reduced. That is, the time before a setting apparatus-culturing condition is found out can be reduced.

According to the above method, for example, it is possible to cause the three entities of a manufacturer who manufactures and provides a culturing apparatus, a culturist who performs cell culture actually using the culturing apparatus, and a specialized agency that runs a cell culturing test to organically cooperate with each other to constitute an organization. In this case, the knowledge and experience of the respective entities can be used in the process of finding out a setting apparatus-culturing condition.

According to the above embodiment, it is possible to cause the three entities of a manufacturer who manufactures and provides a culturing apparatus, a user who performs cell culture actually using the culturing apparatus, and a specialized agency that runs a cell culturing test to organically cooperate with each other. That is, it is possible to use the knowledge and experience of the respective entities in the process of finding out a setting apparatus-culturing condition.

The above assistance apparatus may be used for purposes other than the method and the mechanism shown in FIG. 1 or the like. For example, the above assistance apparatus may be used for the development of a culturing apparatus, entrusted culture, or the like. In the above embodiment, the setting of an apparatus-culturing condition, the operation of a test apparatus, and the evaluation of a test result are basically performed by humans, but all or some of the setting, the operation, and the evaluation may be automated. Multiple apparatuses included in the above embodiment may be connected to each other via a network. The network includes the Internet. For example, the assistance apparatus may be configured as a cloud service on the Internet.

The invention claimed is:

1. A culturing apparatus setup method comprising:
   an initial-stage determination step of determining an initial-stage test apparatus-culturing condition on a basis of a manual culturing condition found out by a manual culturing test;
   a testing step of finding out a setting apparatus-culturing condition by running multiple apparatus-culturing tests using a test culturing apparatus with multiple test apparatus-culturing conditions including the initial-stage test apparatus-culturing condition set in the test culturing apparatus; and
   a setting step of generating a customized culturing apparatus by setting the setting apparatus-culturing condition in a culturing apparatus, wherein
   multiple culturing condition pairs are managed on a database,
   the respective culturing condition pairs include a manual culturing condition found out in a past and an apparatus-culturing condition found out in a past on a basis of the manual culturing condition, and
   the initial-stage test apparatus-culturing condition is determined through use of the database in the initial-stage determination step.

2. The culturing apparatus setup method according to claim 1, wherein
   the manual culturing condition is a condition for culturing a specific cell by manual culture,
   the respective apparatus-culturing conditions are conditions for culturing the specific cell by apparatus culture, and
   the customized culturing apparatus is a dedicated culturing apparatus that cultures the specific cell.

3. The culturing apparatus setup method according to claim 1, wherein
   cell information is assigned to each of the culturing condition pairs on the database, and
   a culturing condition pair to be referred is selected from among the multiple culturing condition pairs registered in the database in accordance with specified cell information in the initial-stage determination step.

4. The culturing apparatus setup method according to claim 3, wherein
   the found-out manual culturing condition is compared with a manual culturing condition in the culturing condition pair to be referred, and an apparatus-culturing condition in the culturing condition pair to be referred is referred to determine the initial-stage apparatus-culturing condition in the initial-stage determination step.

5. The culturing apparatus setup method according to claim 1, wherein
   the manual culturing condition found out by the manual culturing test is registered in the database as a new manual culturing condition,
   the apparatus-culturing condition found out by the apparatus-culturing tests is registered in the database as a new apparatus-culturing condition, and
   the new manual culturing condition and the new apparatus-culturing condition constitute a new culturing condition pair.

6. The culturing apparatus setup method according to claim 1, wherein
   a determination is made as to whether a result of an apparatus-culturing test satisfies requirement specifications for each of the apparatus-culturing tests in the testing step,
   a test apparatus-culturing condition causing the result of the apparatus-culturing test is corrected to set a next test apparatus-culturing condition when the result of the apparatus-culturing test does not satisfy the requirement specifications, and
   the test apparatus-culturing condition causing the result of the apparatus-culturing test is set as the setting apparatus-culturing condition when the result of the apparatus-culturing test satisfies the requirement specifications.

7. The culturing apparatus setup method according to claim 6, wherein
   the requirement specifications are set on a basis of a result of the manual culturing test.

8. The culturing apparatus setup method according to claim 1, wherein
   the test culturing apparatus and the customized culturing apparatus are physically different apparatuses that satisfy sameness of specifications.

* * * * *